United States Patent
Xu et al.

(10) Patent No.: US 8,654,463 B2
(45) Date of Patent: Feb. 18, 2014

(54) DEVICE AND METHOD FOR CONTROLLING BIT DENSITY OF MAGNETIC CARD

(75) Inventors: Zhigang Xu, Shandong (CN); Guangdong Hu, Shandong (CN); Bingqing Liu, Shandong (CN); Mingang Ou, Shandong (CN); Zhenhu Xie, Shandong (CN)

(73) Assignee: Shandong New Beiyang Information Technology Co., Ltd, Weihai, Shandong (CN)

( * ) Notice: Subject to any disclaimer, the term of this patent is extended or adjusted under 35 U.S.C. 154(b) by 368 days.

(21) Appl. No.: 13/063,192

(22) PCT Filed: Jan. 20, 2009

(86) PCT No.: PCT/CN2009/070225
§ 371 (c)(1),
(2), (4) Date: Mar. 9, 2011

(87) PCT Pub. No.: WO2010/031253
PCT Pub. Date: Mar. 25, 2010

(65) Prior Publication Data
US 2011/0170211 A1   Jul. 14, 2011

(30) Foreign Application Priority Data
Sep. 18, 2008   (CN) .......................... 2008 1 0211688

(51) Int. Cl.
*G11B 25/04* (2006.01)
*G06K 19/06* (2006.01)

(52) U.S. Cl.
USPC ............................................. 360/2; 235/493

(58) Field of Classification Search
None
See application file for complete search history.

(56) References Cited

FOREIGN PATENT DOCUMENTS

| CN | 1026367 | 10/1994 |
|---|---|---|
| CN | 1041357 | 12/1998 |
| JP | 6-19166 | 3/1994 |
| JP | 2004-13933 | 1/2004 |

OTHER PUBLICATIONS

PCT International Search Report, PCT/CN2009/070225, dated Jul. 2, 2009.

*Primary Examiner* — Regina N Holder
(74) *Attorney, Agent, or Firm* — Knobbe Martens Olson & Bear, LLP (57) ABSTRACT

A device and a method for controlling a bit density of a magnetic card (2) are provided. Said control device comprises a stepper motor (1) providing power to drive the magnetic card (2) or a recording magnetic head (15), a transmission mechanism transferring power to the magnetic card (2) or the recording magnetic head (15), a CPU (10) sending magnetic recording information, a track data encoder (13) receiving a magnetic writing pulse signal (CLK1) and generating magnetic writing data in synchronization with the magnetic writing pulse signal (CLK1), and a magnetic head driving circuit (14) outputting a magnetic writing control signal based on the magnetic writing data. The frequency of the magnetic writing pulse signal (CLK1) and the frequency of a driving pulse signal (CLK0) of the stepper motor are in a linear relationship. Said control method is a method for controlling a bit density.

14 Claims, 5 Drawing Sheets

DEVICE AND METHOD FOR CONTROLLING BIT DENSITY OF MAGNETIC CARD

CROSS-REFERENCE TO RELATED APPLICATIONS

This application is the U.S. National Phase application under 35 U.S.C. §371 of International Application PCT/CN2009/070225 filed Jan. 20, 2009, which claims priority to Chinese Application 200810211688.2 filed Sep. 18, 2008.

The present application claims the priority of Chinese Patent No. 200810211688.2 filed with the Chinese Patent Office on Sep. 18, 2008, entitled "Device and Method for Controlling Bit Density of Magnetic Card", and the contents thereof in entirety are herein incorporated by reference.

FIELD OF THE INVENTION

The present invention relates to the field of recording by excitation or demagnetization of a recording medium, specifically speaking, to a device and a method for controlling a bit density of a magnetic card.

BACKGROUND OF THE INVENTION

A magnetic card is a kind of a magnetic recording media card which is made of a film base of a certain material and a particulate magnetic material coated uniformly on the film base, and has moisture-resistant and wear-resistant characteristics, certain flexibility, portability and a relatively stable and reliable usefulness. Depending on the materials of the film base, the magnetic card can be classified into two types, a plastic magnetic card and a paper-based magnetic card, for instance, a prepaid phone card, a charge card, a membership card, a debit card, a credit card, etc. are common plastic magnetic cards, while a ticket, a boarding card, a train ticket, etc. are common paper-based magnetic cards.

For reading and writing data, a corresponding magnetic card reading/writing device is needed which comprises a recording magnetic head. Generally, the recording magnetic head is composed of an annular iron core with a gap therein and a coil wound around the iron core. When recording, the magnetic head moves at a certain speed or the magnetic card moves at a certain speed, wherein the recording magnetic head comes into contact with a magnetic surface of the magnetic card. Once the coil of the magnetic head is electrified, an magnetic field, which is in linear proportion to the current, is generated in the gap. The magnetic body of the part of the magnetic card which is in contact with the gap is are magnetized. After the magnetic card is magnetized, remanent magnetization varying corresponding the electric current is left in a magnetic layer of the magnetic card which moves away from the gap. Thus, recording signal is recorded or stored as remanent magnetization in the magnetic card.

What needs to be explained is that the recording of magnetic information is performed on a bitwise basis. The data to be recorded is composed of a data bit and a timing bit. Flux transition generated between two clocks is denoted by "1", and no flux transition is denoted by "0". Generally, unscrambling data is accomplished by distinguishing relative pulse widths of the data bits, and double frequency phase coherence recording (F2F encoding) technology is used to write data into the magnetic card.

Herein, the width of the data bit "0" or "1" depends upon a bit density. The so-called bit density refers to a binary bit stored in a track direction per unit length, and the unit thereof is generally denoted by bit/inch (bpi). The larger the bit density is, the larger the data volume which is recorded in the track is. Therefore, the bit density is a criterion for measuring the data volume of the track, which is also the recoding density that people commonly refer to. In order to guarantee the universality of the magnetic card, especially the universality of the magnetic card for bank application, the internationally-stipulated standard bit densities are 210 bpi and 75 bpi. With the expansion of the application fields of the magnetic card, the standard bit densities fail to satisfy the demand of an industrial user. In particular, when the data volume, which some industrial users need to record, is relatively large or the recorded information needs to be confidential, a non-standard bit density is generally used to record magnetic information.

The traditional method for controlling the bit density of the magnetic card is: a photoelectric encoder is used to detect the displacement of the magnetic card; according to the set requirements of bit density, a pulse signal is outputted as a magnetic writing pulse when the magnetic card moves a set distance; and the CPU controls the electric current variation of the coil of the magnetic head according to the recorded data, to accomplish the recording of the bit data.

Figure 1:
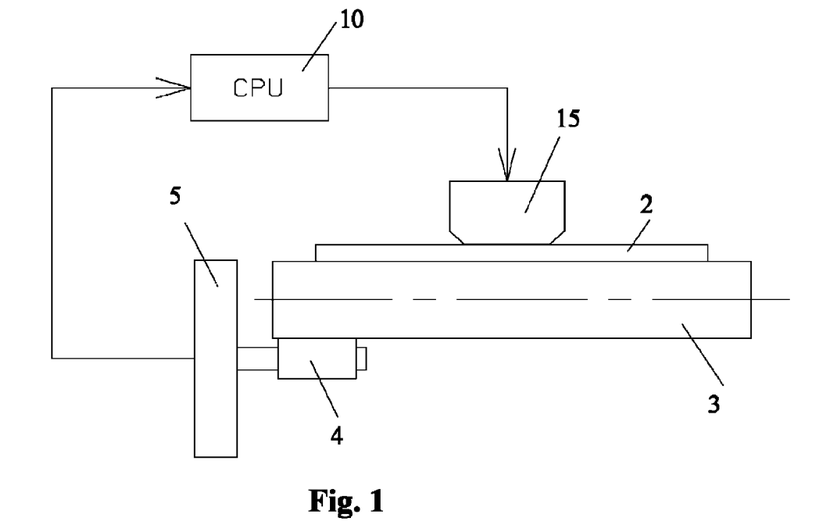
FIG. 1 is a schematic diagram of a traditional device for controlling a bit density of a magnetic card.

Referring to FIG. 1, the figure is a schematic diagram of a traditional device for controlling a bit density of a magnetic card. As shown in FIG. 1, a magnetic card recording apparatus comprises a recording magnetic head 15, a conveyor roller 3, a transition roller 4, a photoelectric encoder 5, etc. When recording magnetic information, a magnetic card 2 passes through between the recording magnetic head 15 and the conveyor roller 3, and is driven by the conveyor roller 3 to move. The transition roller 4 is coaxial with the photoelectric encoder 5 and is in tangential contact with the conveyor roller 3. The rotation of the conveyor roller 3 makes the transition roller 4 rotate simultaneously. Obviously, the transition roller 4 is used to make a transition for transmission, so as to easily obtain a relationship between the moving distance of the magnetic card 2 and the rotation angle of the photoelectric encoder 5. Therefore, the radius of the transition roller 4 and the precision of the photoelectric encoder 5 are selected according to the value of bit density, such that the magnetic writing pulse signal, viz. a magnetic writing synchronization signal, required by the bit density can be obtained.

However, said control device has certain drawbacks, i.e., once the photoelectric encoder 5 is selected, the maximum number of an outputted pulse signal is unchanged, such that the bit density of the magnetic card can not be adjusted. In addition, the greater the bit density value is, the higher the precision of the photoelectric encoder is, thus the control cost is increased correspondingly. In addition, said device can only control the bit density of one track, which does not meet the requirement that two or more tracks use different bit densities, thereby its application is limited.

SUMMARY OF THE INVENTION

In view of the above, the present invention provides a device for controlling a bit density of a magnetic card, which can change flexibly the bite density of the magnetic card according to needs. On this basis, the present invention also provides a method for controlling a bit density of a magnetic card.

In order to solve the above technical problem, the device for controlling the bit density of the magnetic card comprises:

a prime mover for providing power required by driving the magnetic card to move relative to a recording magnetic head or driving the recording magnetic head to move relative to the magnetic card;

a transmission mechanism for transmitting the power outputted by the prime mover to the magnetic card or the recording magnetic head correspondingly;

a CPU for sending related information of magnetic recording via a data/address/control bus, with the related information including data information, address information, and control information;

a track data encoder for receiving a magnetic writing pulse signal and the related information for achieving synchronization and encoding the data information in the case of synchronization of the magnetic writing pulse signal, to form magnetic writing data, wherein the magnetic wiring data comprises a timing bit and a data bit; and a magnetic head driving circuit for receiving the magnetic writing data and outputting a magnetic writing control signal according to the magnetic writing data, wherein the magnetic writing control signal is used for controlling electric current variation of a coil of the recording magnetic head so as to control flux transition;

the prime mover is a stepper motor, in which the frequency of the magnetic writing pulse signal and the frequency of the driving pulse signal of the stepper motor is in a linear relationship.

Preferably, the device also comprises a frequency divider for dividing the frequency of the driving pulse signal of the stepper motor according to a divider value and then outputting the magnetic writing pulse signal, wherein the divider value is predetermined according to the bit density required by the track.

Preferably, the device also comprises a divider value register for storing the divider value and sending the divider value to the frequency divider, wherein the divider value is included in the related information sent by the CPU.

Preferably, the device also comprises a plurality of track bit density controlling channels, each of which comprises a set of a track data encoder and a magnetic head driving circuit, wherein the respective track bit density controlling channels obtain the magnetic writing pulse signal through a set of a divider value register and a frequency divider.

Preferably, a multi-way selection switch is provided between the frequency divider and the track data encoder, such that the track bit density control channels with the same bit density share a set of a divider value register and a frequency divider to obtain the magnetic writing pulse signal.

Preferably, the driving pulse signal of the stepper motor is sent by the CPU.

The method for controlling the bit density of the magnetic card provided by the present invention comprises that:

outputting, by a stepper motor, power which passes through a transmission mechanism to drive the magnetic card to move relative to a recording magnetic head or drive the recording magnetic head to move relative to the magnetic card;

sending, by a CPU, related information of magnetic recording via a data/address/control bus, with the related information including data information, address information and control information;

a track data encoder receiving a magnetic writing pulse signal and the related information for achieving synchronization and encoding the data information in the case of synchronization of the magnetic writing pulse signal, to form a timing bit and a data bit of magnetic writing data; and a magnetic head driving circuit receiving the magnetic writing data, outputting a magnetic writing control signal according to the magnetic writing data, and controlling electric current variation of a coil of the recording magnetic head, so as to control flux transition.

Preferably, the frequency of the driving pulse signal of the stepper motor is divided by a frequency divider to obtain the magnetic writing pulse signal, wherein the divider value of the frequency divider is determined according to a bit density required by a track.

Preferably, a divider value register sends the divider value to the frequency divider, the divider value included in the related information sent by the CPU.

Preferably, the driving pulse signal of the stepper motor is sent by the CPU.

Compared with the prior art, the present invention has the advantages of changing flexibly the bit density of the magnetic card according to requirements and satisfying the demand that two or more tracks use different bit densities without increasing the hardware cost. Specifically speaking, a stepper motor is used as a power source with the rotation speed and the stop position thereof depending upon the frequency and the pulse number of the driving pulse signal, such that the magnetic card or the recording magnetic head is controlled to move as required for ensuring the movement of the magnetic card or the recording magnetic head to synchronize with the driving pulse of the stepper motor. The frequency of the magnetic writing pulse signal and that of the driving pulse signal of the stepper motor are in a linear relationship. the driving pulse of the stepper motor can be converted into a magnetic writing pulse according to the requirement of the bit density so as to accomplish data recoding. The frequency of the driving pulse signal of the stepper motor is adjusted or the frequency of the driving pulse signal of the stepper motor is divided or multiplied to obtain a corresponding magnetic writing pulse signal, to meet the requirements for the specific bit density. In particular, multiple magnetic writing pulse signals can be simultaneously obtained in the present invention, thereby it can be easily expanded into multiple bit density controlling channels so as to satisfy the requirement that two or more tracks use different bit densities; moreover, the photoelectric encoder is omitted and it is unnecessary to add the hardware, which are beneficial for cost reduction.

DETAILED DESCRIPTION OF THE PREFERRED EMBODIMENTS

For facilitating explanation, the related terms used in the embodiments of the present invention are explained hereinafter.

A stepper motor is an open-loop control element converting an electric pulse signal into angular displacement or linear displacement. In a non-overload case, the rotation speed and the stop position of the motor only depend upon the frequency and the pulse number of the pulse signal and are not influenced by a change in load, viz. if a pulse signal is provided for the motor, the motor rotates by a step angle.

Microstepping control (also referred to as a subdivision technique) is a new technology of a open-loop control of a stepper motor, in which the electric currents of the windings with respective phases are controlled by a D/A conversion circuit and pulse width modulation (PWM) to make the magnitude and direction of the amplitude value thereof vary based on certain rules, so as to divide uniformly one full step of the stepper motor into plural finer micro-steps, e.g. step distances of a ½ step, a ¼ step, ⅛ step, or the like. By subdividing the step distance of the stepper motor, the resolution is increased, torque ripple and low speed oscillation are reduced, and the operation is made more stable.

The basic idea of the present invention is to use a stepper motor to drive a magnetic card or a recording magnetic head to move and to make the frequency of the magnetic writing pulse signal and that of the driving pulse signal of the stepper motor in a linear relationship.

The operation principle of the present invention is: using the characteristic that the driving pulse of the stepper motor is synchronized with the displacement of the magnetic card or the recording magnetic head to convert the driving pulse of the stepper motor into a magnetic writing pulse according to the requirement of bit density, so as to accomplish data recording. This is because: every time the driver of the stepper motor receives one pulse, the stepper motor rotates by a step angle. According to the magnitude of the transmission ratio, the distance by which the magnetic card or the recording magnetic head moves when the stepper motor makes a move of one step is calculated by conversion. In other words, the driving pulse of the stepper motor and the distance by which the magnetic card or the recording magnetic head moves is in a one-to-one correspondence relationship. Since the bit density refers to the number of the binary bits stored in the track direction per unit length and every time one bit of binary data is stored, it is required for the control device to send one pulse signal to the magnetic head. Therefore, the frequency of the driving pulse signal of the stepper motor is adjusted or the frequency of the driving pulse of the stepper motor is divided or multiplied according to the requirement of the bit density, such that an effective pulse can be selected as a magnetic writing pulse.

Specific embodiments will be explained hereinafter in combination with the figures.

Figure 2:
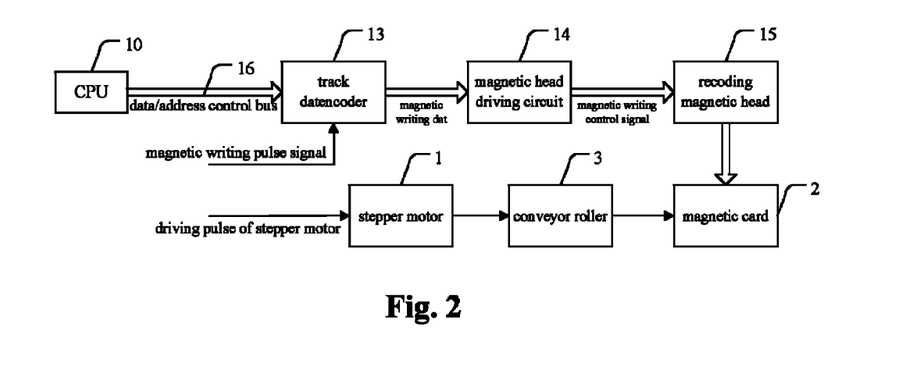
FIG. 2 is a schematic diagram of a device for controlling a bit density of a magnetic card according to the first embodiment of the present invention.

Referring to FIG. 2, the figure is a schematic diagram of a device for controlling a bit density of a magnetic card according to the first embodiment of the present invention. Said device for controlling the bit density of the magnetic recording apparatus comprises: a stepper motor 1, a conveyor roller 3, a CPU 10, a track data encoder 13, a magnetic head driving circuit 14, a recording magnetic head 15, a data/address/control bus 16, etc., wherein:

the conveyor roller 3 is configured to transfer correspondingly power outputted by a prime mover (the stepper motor 1 in this embodiment) to a magnetic card 2, viz. to drive the magnetic card 2 to move relative to the recording magnetic head 15;

a CPU 10 is configured to send related information of magnetic recording via the data/address/control bus 16, the related information including data information, address information, and control information;

a track data encoder 13 is configured to receive a magnetic writing pulse signal and the related information for achieving synchronization of the magnetic recording, and to encode the data information in the case of synchronization of the magnetic writing pulse signal, so as to form magnetic writing data, the magnetic writing data including a timing bit and a data bit;

a magnetic head driving circuit 14 is configured to receive the magnetic writing data, and output a magnetic writing control signal according to the magnetic writing data, with the magnetic writing control signal used for controlling electric current variation of a coil of the recording magnetic head so as to control flux transition; in other words, the recording of bit data of the magnetic track is accomplished on the magnetic body of the magnetic card 2; and a stepper motor 1 is configured to drive the rotation of the conveyor roller 3, wherein the frequency of the magnetic writing pulse signal and that of the driving pulse signal of the stepper motor is in a linear relationship, which is generally a convenient direct proportion relationship.

In the above device for controlling the bit density of the magnetic card: the stepper motor 1 is used as a power source, and the rotation speed and the stop position of the stepper motor 1 depend upon the frequency and the pulse number of the driving pulse signal so as to control the magnetic card 2 to move as required, for ensuring the synchronization between the movement of the magnetic card 2 and the driving pulse of the stepper motor 1; the frequency of the magnetic writing pulse signal and that of the driving pulse signal of the stepper motor 1 is in a linear relationship; the driving pulse of the stepper motor 1 can be converted into a magnetic writing pulse according to the requirement of the bit density to accomplish data recording; and the frequency of the driving pulse signal of the stepper motor 1 is adjusted, or the frequency of the driving pulse signal of the stepper motor 1 is divided or multiplied to obtain a corresponding magnetic writing pulse signal for meeting the requirement of a specific bit density of a magnetic track.

In particular, said device for controlling the bit density of the magnetic card can obtain simultaneously multiple magnetic writing pulse signals for easy expansion into multiple bit density controlling channels, so as to satisfy the requirement that two or more tracks use different bit densities; moreover the photoelectric encoder 5 is omitted without adding the hardware, which are beneficial for cost reduction.

In this embodiment, the stepper motor 1 is a prime motor and the conveyor roller 3 is a transmission mechanism, so as to drive the magnetic card 2 to move relative to the recording magnetic head 15. Obviously, it is also possible that the stepper motor 1 is a prime mover and a turbine-worm mechanism, a gear-rack mechanism, or the like is a transmission mechanism, so as to drive the recording magnetic head 15 to move relative to the magnetic card 2 with the operation principle thereof same as that of the present embodiment and therefore the specific description thereof not made herein. In addition, the transmission mechanism itself is not the object of the present invention, and no description of its structure is made herein, the related detailed technical documents capable of be obtained by referring to the existing documents.

What needs to be explained is that, the magnetic writing pulse signal in the present invention can be obtained either directly from a signal generator or by converting the driving pulse signal of the stepper motor 1. Preferably, the magnetic writing pulse signal is a frequency-converted signal of the driving pulse signal of the stepper motor 1. Therefore, a corresponding inverter is needed for converting the frequency of the driving pulse signal.

Figure 3:
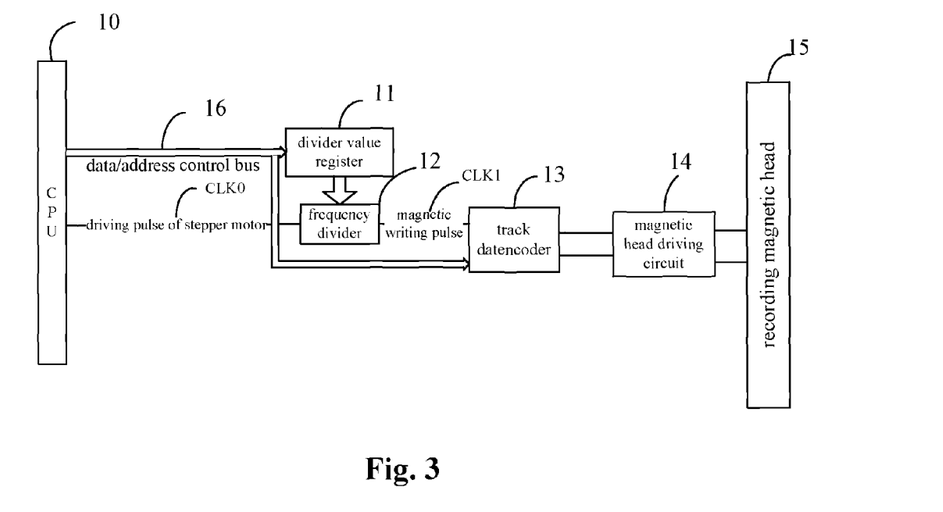
FIG. 3 is a schematic diagram of a device for controlling a bit density of a magnetic card according to the second embodiment of the present invention.

In order to improve the bit density of the magnetic card, the frequency converter of the present invention is a frequency divider, and the divider value thereof can be sent by a divider value register, wherein the divider value can be included in the related information sent by the CPU. In addition, the driving pulse signal of the stepper motor can also be sent by the CPU. The specific explanation is as follows:

Referring to FIG. 3, said figure is a schematic diagram of a device for controlling a bit density of a magnetic card according to the second embodiment of the present invention. The device for controlling the bit density of the magnetic card in this embodiment comprises a stepper motor (not shown in FIG. 3), a conveyor roller (not shown in FIG. 3), a CPU 10, a divider value register 11, a frequency divider 12, a track data encoder 13, a magnetic head driving circuit 14, a magnetic head 15, a data/address/control bus 16, etc, with the operation process thereof is as follows.

The CPU 10 transmits the data information, address information, or control information via the data/address/control bus 16 to the divider value register 11 and the track data encoder 13. The divider value register 11 is configured to receive the divider value sent by the CPU and said divider value is determined depending upon a sit density value. The frequency divider 12 is configured to receive the divider value, to divide the frequency of the driving pulse CKL0 of the stepper motor according to the divider value, and to output a magnetic writing pulse CLK1. The track data encoder 13 is configured to receive the recorded data sent by the CPU 10 and the magnetic writing pulse CLK1 sent by the frequency divider 12 and to make the two correspond to each other one by one, viz. to encode data information in the case of synchronization of the magnetic writing pulse CLK1 so as to form a data bit and a timing bit of the magnetic writing data. The magnetic head driving circuit 14 is configured to receive magnetic writing data, to control the electric current direction of the coil of the recording magnetic head 15 according to the magnetic writing data, and to control flux transition, so as to accomplish recording 0 or 1 on the magnetic body of the magnetic card 2.

In this embodiment, the bit density can be changed by changing the divider value, and the relationship between the bit density and the divider value is explained by the following formula, which is specifically:

assuming that the bit density is M (the unit thereof is bit/mm), the transmission ratio is i, the step angle of the stepper motor is a (the unit is degree), the transmission diameter is D (the unit is mm), and the divider value is V, there is $$M=(360*i)/(\alpha*\pi*D*V) \quad (1)$$

It is shown in Formula (1) that the bit density can be adjusted by adjusting the divider value; vice versa, the desired divider value can be determined according to the bit density.

Meanwhile, the bit density can be increased by the microstepping control of the stepper motor. Assuming the stepper motor uses the microstepping control of t, there is $$M=(360*i*t)/(\alpha*\pi*D*V) \quad (2)$$

It is shown in Formula (2) the greater t is, the greater M is, viz. the more the data recorded per unit distance is.

Thus, compared with the prior art, in this embodiment, the change of the bit density is not confined by the specification of the device; meanwhile, a relatively large bit density value is easily realized.

In the above embodiment, a device for controlling a bit density of a single track is provided. In fact, the present invention is easily developed into a device for controlling bit densities of multiple tracks, which is described hereinafter by taking three channels as an example Referring FIG. 4, said figure is a schematic diagram of a device for controlling a bit density of a magnetic recording apparatus according to the third embodiment of the present invention. Compared with the second embodiment of the present invention, three track bit density controlling channels are provided, wherein each track bit density controlling channel comprises a set of a track data encoder and a magnetic head driving circuit; and the respective track bit density controlling channel obtains the magnetic writing pulse signal via a set of a divider register and a frequency divider. Therefore, in the present embodiment, controlling the bit densities of three tracks can be realized by adding two sets of a divider value memory and a frequency divider and two sets of a track data encoder and a magnetic head driving circuit. The description thereof will be made hereinafter.

Figure 4:
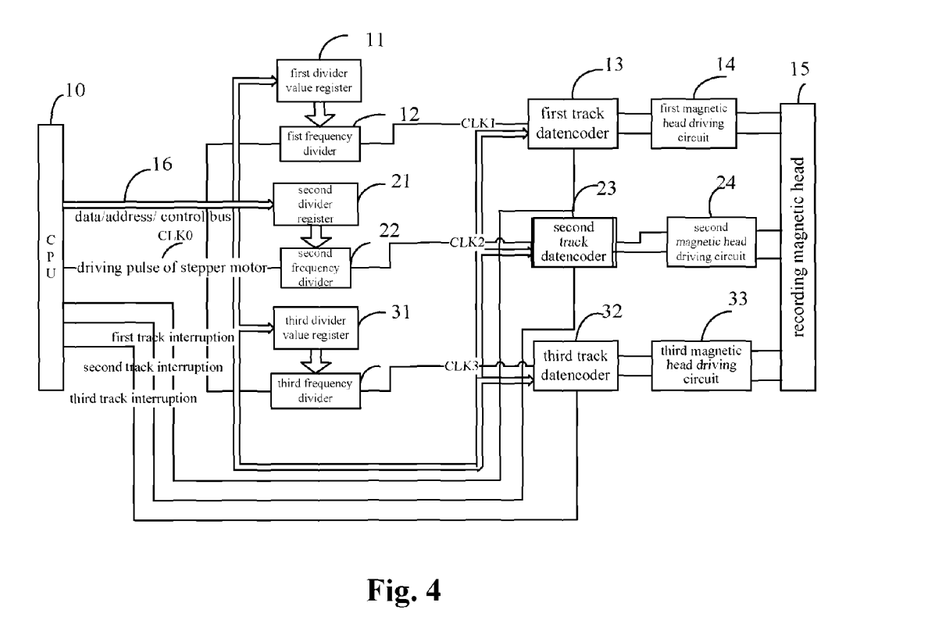
FIG. 4 is a schematic diagram of a device for controlling a bit density of a magnetic card according to the third embodiment of the present invention.

The CPU 10 is connected to a first divider value register 11, a second divider value register 21, and a third divider value register 31 as well as a first track data encoder 13, a second track data encoder 23, and a third track data encoder 33 via the data/address/control bus 16. The CPU 10 sends a driving pulse CLK0 of the stepper motor to a first frequency divider 12, a second frequency divider 22, and a third frequency divider 32 simultaneously. The frequency of the driving pulse CLK0 of the stepper motor is divided by the first frequency divider 12, the second frequency divider 22, and the third frequency divider 32 to output three magnetic writing pulses, respectively, viz. a first magnetic writing pulse CLK1, a second magnetic writing pulse CLK2, and a third magnetic writing pulse CLK3. The frequency of each magnetic writing pulse can be adjusted by the CPU 10 controlling a corresponding divider value register. The first magnetic writing pulse CLK1, the second magnetic writing pulse CLK2, and the third magnetic writing pulse CLK3 are input to a first track data encoder 13, a second track data encoder 23, and a third track data encoder 33, respectively. The three track data encoders perform a synchronous encoding process on byte data of respective tracks sent by the CPU 10 in the case of synchronization of their individual magnetic writing pulses. Meanwhile, the first track data encoder 13, the second track data encoder 23, and the third track data encoder 33 output a magnetic writing control signal to a first magnetic head driving circuit 14, a second magnetic head driving circuit 24, and a third magnetic head driving circuit 34, respectively, and control the electric current direction of the corresponding magnetic head driving circuit, to perform a magnetic writing operation. After encoding the byte data of respective tracks is accomplished, an interruption request signal is respectively sent to the CPU 10 to request the next byte data from the CPU 10.

In this embodiment there are provided multiple bit density controlling channels, so as to satisfy the requirement that two or more tracks use different bit densities.

As for a device for controlling a bit density of a magnetic card with multiple channels, further improvement can be made, for example: when there are the track bit density controlling channels of the same family, viz. when there are track bit density controlling channels with the same track bit density, all or part of divider value registers and frequency dividers can be shared.

In the present invention, if multiple track bit density controlling channels exist, the number of the sets of the divider value register and the frequency divider is smaller than or equal to the number of the sets of the track data encoder and the magnetic head driving circuit, wherein the principles for selecting the divider value register and the frequency divider are: if the magnetic heads of three tracks magnetically write using simultaneously two bit densities, only two sets of a divider value register and a frequency divider are needed, and if they magnetically write using simultaneously three bit densities, three sets of a divider value register and a frequency divider are needed; and if the magnetic heads of four tracks magnetically write using simultaneously two bit densities, only two sets of a divider value register and a frequency divider are needed, and if they magnetically write using simultaneously three bit densities, only three sets of a divider value register and a frequency divider are needed, and if they magnetically write using simultaneously four bit densities, four sets of a divider register and a frequency divider are needed; and if the number of the tracks are increased continuously, said principle can also be referred to for assignment. No description thereof is made herein.

Two situations of all sharing the divider value registers and the frequency dividers and partly sharing of the divider value registers and the frequency dividers are hereinafter described, respectively.

Figure 5:
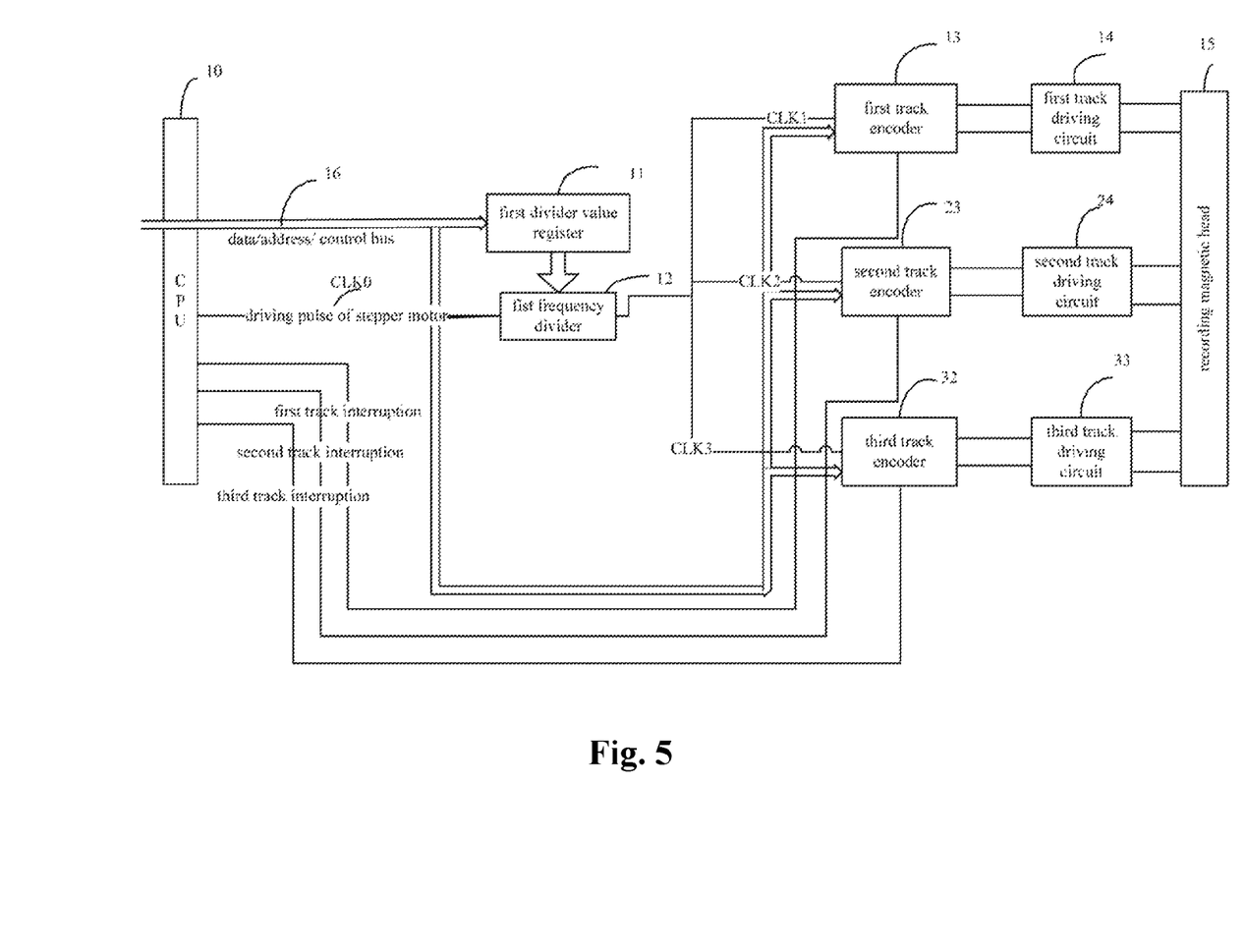
FIG. 5 is a schematic diagram of a device for controlling a bit density of a magnetic card according to the fourth embodiment of the present invention.

Referring to FIG. 5, said figure is a schematic diagram of a device for controlling a bit density of a magnetic card according to the fourth embodiment of the present invention. Compared with the third embodiment, the bit densities of three tracks in this embodiment all are same, therefore, all the first divider value registers 11 and the first frequency dividers 12 can be shared.

As shown in FIG. 5, the pulse CLKA outputted by the first frequency divider 12 is received simultaneously by the first track data encoder 13, the second track data encoder 23, and the third track data encoder 33 in the three tracks as a corresponding a first magnetic writing pulse CLK1, a second magnetic writing pulse CLK2, and a third magnetic writing pulse CLK3. In this way, only one set of the divider value register and the frequency divider needs to be provided to realize controlling of the bit densities of the three tracks.

In a situation of partly sharing of the divider value register and the frequency divider, a multi-way selection switch is provided to allocate conveniently the magnetic writing pulse signal outputted by the shared frequency divider to the track bit density controlling channels with the same bit density, viz. respective track data encoders in the track bit density controlling channels of the same family. Specifically, a multi-way selection switch is provided between the frequency divider and the track data encoder, such that the track bit density controlling channels with the same bit density share a set of the divider value register and the frequency divider to obtain the magnetic writing pulse signal. Therefore, the use of the multi-way selection switch satisfies the requirement of using the minimum number of the divider value registers and the frequency dividers to control simultaneously multi-track bit densities, thereby reducing the number of the divider value register and the frequency divider and saving the cost. The further explanation is made as follows.

Figure 6:
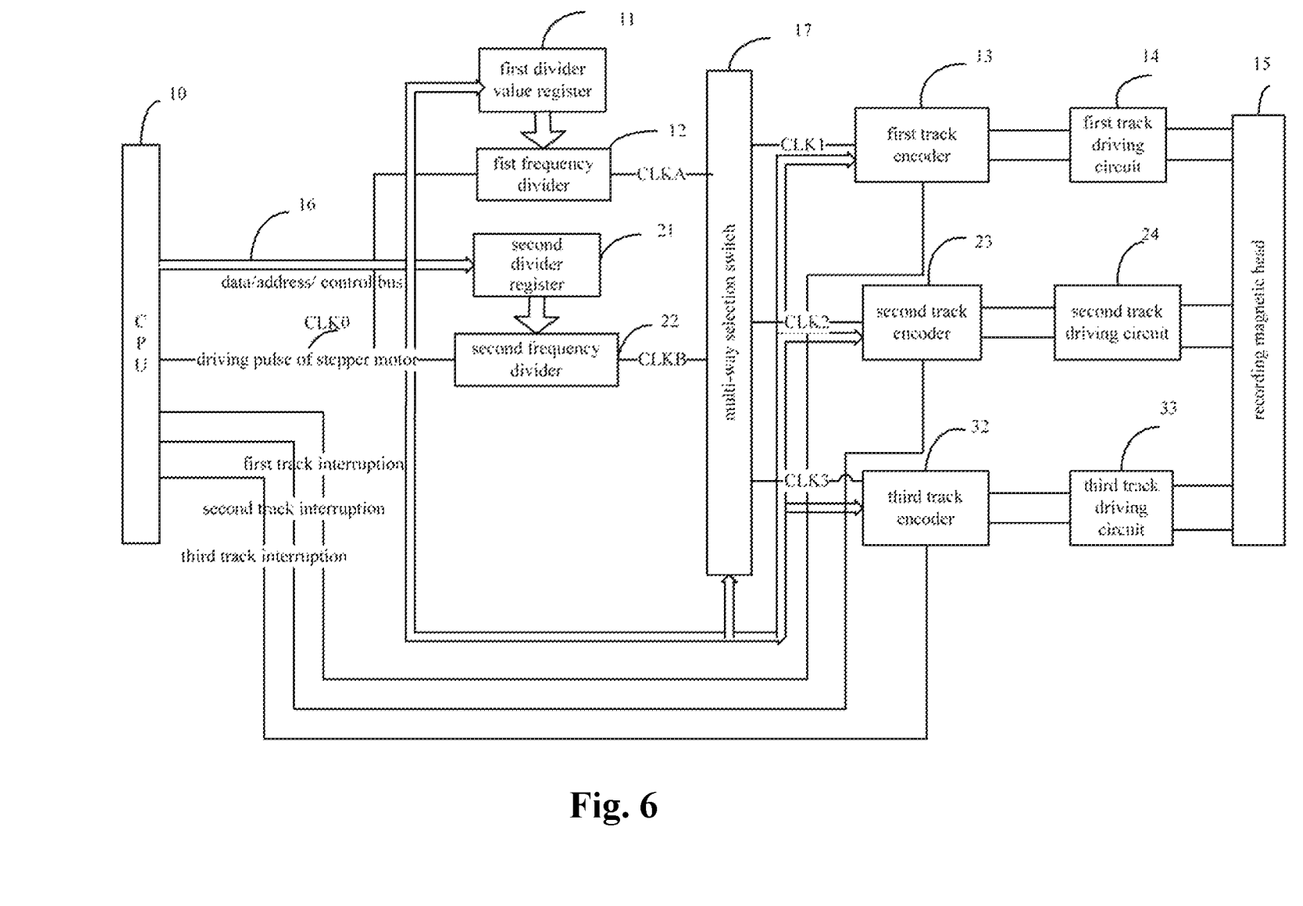
FIG. 6 is a schematic diagram of a device for controlling a bit density of a magnetic card according to the fifth embodiment of the present invention.

Referring to FIG. 6, said figure is a schematic diagram of a device for controlling a bit density of a magnetic card according to the fifth embodiment of the present invention. In this embodiment, the bit densities of the second track and third track are the same, thereby the second divider value register 21 and the second frequency divider 22 are shared. Likewise, a multi-way selection switch 17 is provided for assigning a pulse CLKA outputted by the first frequency divider 12 to the first track data encoder 13 in the first channel to form a first magnetic writing pulse CLK1, and assigning a magnetic writing pulse CLKB outputted by the second frequency divider 22 simultaneously to the second track data encoder 23 and the third track data encoder 33 in the second and third channels to form a corresponding second magnetic writing pulse CLK2 and third magnetic writing pulse CLK3. In this way, two sets of a divider value register and a frequency divider are provided, and it can realize controlling the bit densities of the three channels by the selection of the multi-way selection switch 17.

The device for controlling the bit density of the magnetic card is described hereinbefore in detail, and the method for controlling the bit density of the magnetic card is described hereinafter.

Figure 7:
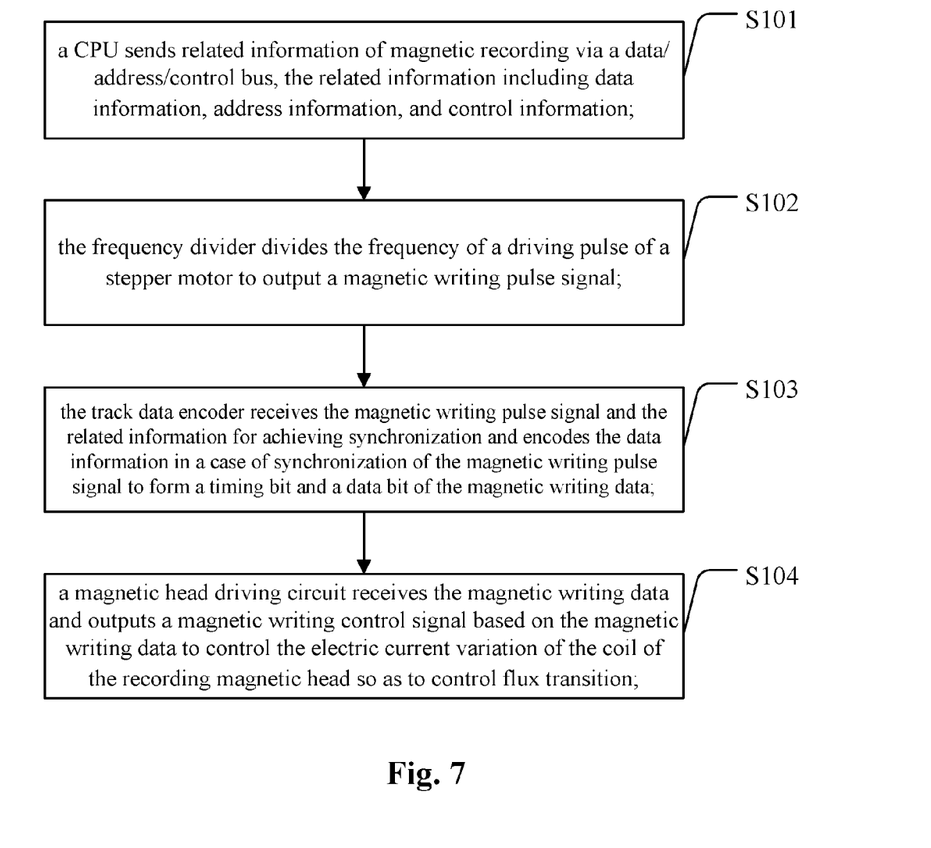
FIG. 7 is a flow chart of a method for controlling a bit density of a magnetic card according to a preferable embodiment of the present invention.

Referring to FIG. 7, said figure is a flow chart of a preferable embodiment of a method for controlling a bit density of a magnetic card in the present invention. The basis for said control method is: the stepper motor outputs power and the power passes through the transmission mechanism to drive the magnetic card to move relative to the recoding magnetic head or drive the recording magnetic head to move relative to the magnetic card.

In addition, the following steps are also included:

S101, a CPU sends related information of magnetic recording via a data/address/control bus, the related information including data information, address information, and control information;

wherein in the case that a divider value register is provided, the CPU sends the related information to the divider value register and a track data encoder, respectively, and these information includes divider values and magnetic writing data values determined based on bit density;

S102, the frequency divider divides the frequency of a driving pulse of a stepper motor to output a magnetic writing pulse signal;

wherein preferably, the frequency divider is used to divide the frequency of the driving pulse of the stepper motor (e.g. the driving pulse of the stepper motor is frequency-divided as a 100 KHz signal) to output a magnetic writing pulse for achieving synchronization. Specially, when the divider value register is provided, the frequency divider receives the divider value of the divider value register and divides the frequency of the driving pulse of the stepper motor according to the divider value, wherein the driving pulse signal of the stepper motor can be sent by the CPU so as to realize unified control;

S103, the track data encoder receives the magnetic writing pulse signal and the related information for achieving synchronization and encodes the data information in the case of synchronization of the magnetic writing pulse signal, to form a timing bit and a data bit of the magnetic writing data;

wherein the purpose of this step is to encode recorded data by the track data encoder, and when the track data encoder receives the recorded data and the magnetic writing pulse sent by the CPU, the data information can be encoded in the case of the synchronization of the magnetic writing pulse signal so as to form the timing bit and the data bit of the magnetic writing data;

wherein, the frequency of the magnetic writing pulse signal and that of the driving pulse signal of the stepper motor is in a linear relationship; preferably, the magnetic writing pulse is a divider signal of driving pulse of the stepper motor outputted by the frequency divider; and of course, the magnetic writing pulse can be obtained in other ways, e.g. an output signal of the signal generator; and S104, a magnetic head driving circuit receives the magnetic writing data and outputs a magnetic writing control signal based on the magnetic writing data to control the electric current variation of the coil of the recording magnetic head so as to control flux transition;

Specifically, the magnetic head driving circuit controls the electric current direction of the coil of the recording magnetic head based on the magnetic writing data so as to control flux transition, that is, making the recording magnetic head record 0 or 1 on the magnetic body, and finally, accomplishing the bit data recording of the track on the magnetic body of the magnetic card.

The method for controlling the bit density of the magnetic card of the present invention is described with a single channel as an example in the above embodiment. When using the control of multiple channels, the control can be performed referring to the above method. No description thereof is made therein.

The description above is merely for preferable embodiments of the present invention. It shall be pointed out that, the above preferable embodiments shall not be deemed as limiting the present invention. The scope of protection of the present invention shall be based on the scope defined by the claims. For the person skilled in the art, any improvement and modification can be made within the spirit of the present invention. The improvement and modification can be deemed as the scope of protection of the present invention.

What is claimed is:

1. A device for controlling a bit density of a magnetic card, comprising:
    a prime mover for providing power required by driving the magnetic card to move relative to a recording magnetic head or driving the recording magnetic head to move relative to the magnetic card;
    a transmission mechanism for transmitting the power outputted by the prime mover to the magnetic card or the recording magnetic head correspondingly;
    a CPU for sending related information of magnetic recording via a data/address/control bus, with the related information including data information, address information, and control information;
    a track data encoder for receiving a magnetic writing pulse signal and the related information for achieving synchronization and encoding the data information in the case of synchronization of the magnetic writing pulse signal, to form magnetic writing data, wherein the magnetic writing data comprises a timing bit and a data bit;
    a magnetic head driving circuit for receiving the magnetic writing data and outputting a magnetic writing control signal according to the magnetic writing data, wherein the magnetic writing control signal is used for controlling electric current variation of a coil of the recording magnetic head so as to control flux transition; and
    a frequency divider for dividing frequency of a driving pulse signal of a stepper motor according to a divider value and then outputting the magnetic writing pulse signal, wherein the divider value is predetermined according to the bit density required by the track,
    wherein the prime mover comprises the stepper motor, in which frequency of the magnetic writing pulse signal and frequency of the driving pulse signal of the stepper motor is in a linear relationship.

2. The device for controlling the bit density of the magnetic card according to claim 1, further comprising a divider value register for storing the divider value and sending the divider value to the frequency divider, wherein the divider value is included in the related information sent by the CPU.

3. The device for controlling the bit density of the magnetic card according to claim 2, wherein the driving pulse signal of the stepper motor is sent by the CPU.

4. The device for controlling the bit density of the magnetic card according to claim 2, comprising a plurality of track bit density controlling channels, each of which comprises a set of a track data encoder and a magnetic head driving circuit, wherein the respective track bit density controlling channels obtain the magnetic writing pulse signal through a set of a divider value register and the frequency divider.

5. The device for controlling the bit density of the magnetic card according to claim 4, wherein the driving pulse signal of the stepper motor is sent by the CPU.

6. The device for controlling the bit density of the magnetic card according to claim 4, wherein, a multi-way selection switch is provided between the frequency divider and the track data encoder, such that the track bit density control channels with the same bit density share a set of a divider value register and the frequency divider to obtain the magnetic writing pulse signal.

7. The device for controlling the bit density of the magnetic card according to claim 6, wherein the driving pulse signal of the stepper motor is sent by the CPU.

8. The device for controlling the bit density of the magnetic card according to claim 1, wherein, the driving pulse signal of the stepper motor is sent by the CPU.

9. The device for controlling the bit density of the magnetic card according to claim 1, wherein the driving pulse signal of the stepper motor is sent by the CPU.

10. A method for controlling a bit density of a magnetic card, comprising:
    outputting, by a stepper motor, power which passes through a transmission mechanism to drive the magnetic card to move relative to a recording magnetic head or drive the recording magnetic head to move relative to the magnetic card;
    sending, by a CPU, related information of magnetic recording via a data/address/control bus, with the related information including data information, address information and control information;
    a track data encoder receiving a magnetic writing pulse signal and the related information for achieving synchronization and encoding the data information in the case of synchronization of the magnetic writing pulse signal, to form a timing bit and a data bit of magnetic writing data; and
    a magnetic head driving circuit receiving the magnetic writing data, outputting a magnetic writing control signal according to the magnetic writing data, and controlling electric current variation of a coil of the recording magnetic head, so as to control flux transition,
    wherein, frequency of a driving pulse signal of the stepper motor is divided by a frequency divider to obtain the magnetic writing pulse signal, wherein a divider value of the frequency divider is determined according to a bit density required by a track.

11. The method for controlling the bit density of the magnetic card according to claim 10, wherein, a divider value register sends the divider value to the frequency divider, the divider value included in the related information sent by the CPU.

12. The method for controlling the bit density of the magnetic card according to claim 11, wherein the driving pulse signal of the stepper motor is sent by the CPU.

13. The method for controlling the bit density of the magnetic card according to claim 10, wherein, the driving pulse signal of the stepper motor is sent by the CPU.

14. The method for controlling the bit density of the magnetic card according to claim 10, wherein the driving pulse signal of the stepper motor is sent by the CPU.

* * * * *